July 4, 1933.  A. W. GAY  1,917,110
FULL CIRCLE RETREADER
Filed Aug. 7, 1931
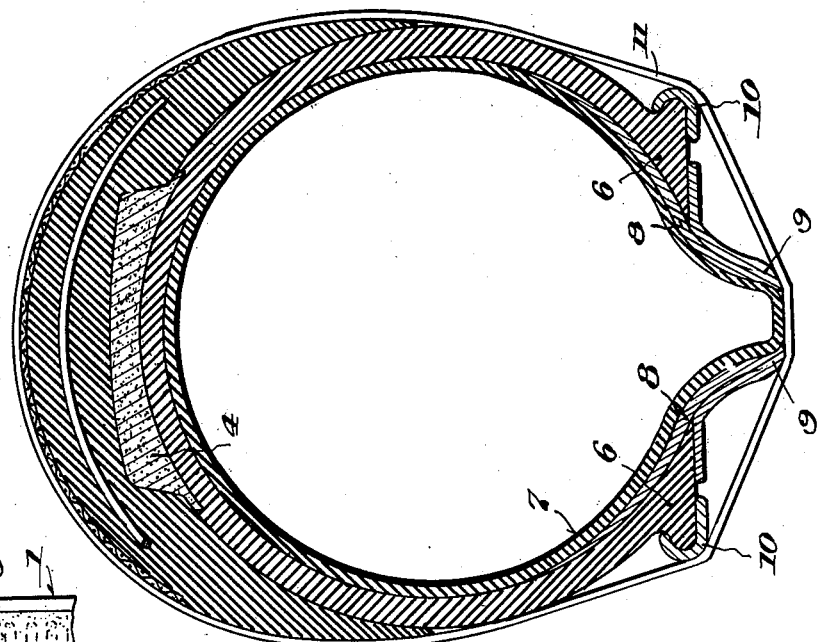
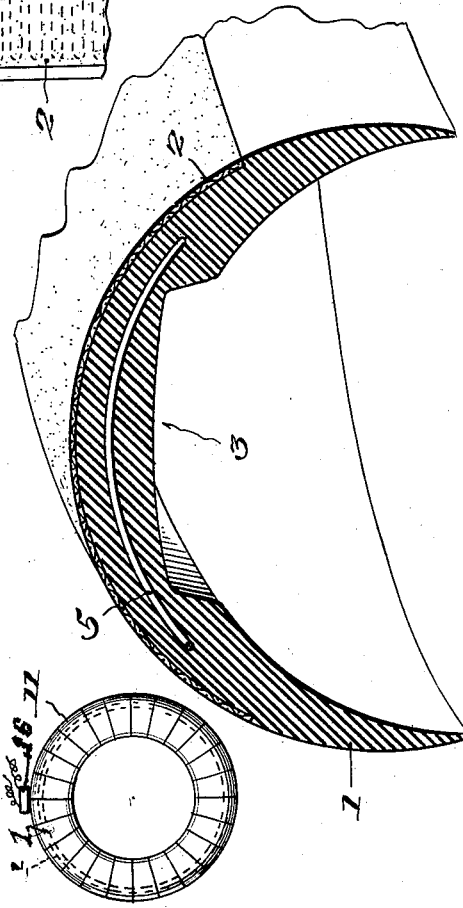
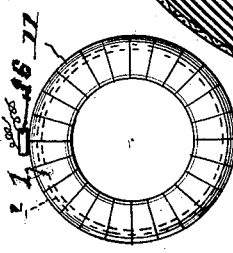
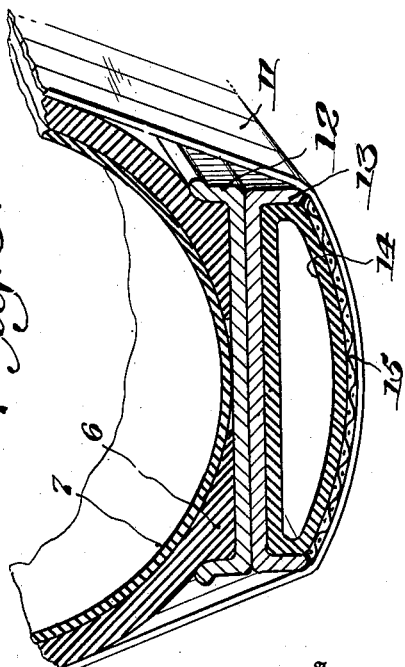
Inventor
AURTHER. W. GAY.
By Edward E Clements
Attorney Patented July 4, 1933                                                            1,917,110

UNITED STATES PATENT OFFICE

ARTHUR WILSON GAY, OF READING, OHIO

FULL CIRCLE RETREADER

Application filed August 7, 1931.  Serial No. 555,831.

My invention relates to apparatus and methods for the retreading of pneumatic tires, with particular reference to shaping and applying pressure and heat for the curing and vulcanizing of new treads.

It is of course well understood that the portion of the tire which receives the most wear and by its duration most directly effects the life of the tire is the tread, and various methods of applying and means for curing new treads have been proposed, all of which however, in so far as they have come to my attention are deficient in certain respects. The retreading device now in most common use consists of a rigid metallic form which is steam heated, and is capable of curing one-third only of a tread at one operation. Obviously, this requires moving of the form from place to place on the tire in order to effect curing all around, and this handling and repeated operation involve multiplied time and expense which I seek to avoid. In addition, a new tread extending all around the tire and cured by this steam apparatus, will be overly cured at every point where one cure ends and another cure is started.

My invention has for its object to supply the deficiencies in the methods and apparatus heretofore in use. I attain my object by providing a continuous unitary tread cover adapted to be applied to and extend completely around the tire to be treated, said cover having a shaped mold within the same adapted to the form and dimensions of the new tread, and electrical heating means embedded in the cover in such fashion as to supply heat uniformly completely across the width of the new tread and completely around the periphery of the tire. In addition to the peripheral cover, I provide a ring or flanged rim to receive and hold the beads of the casing whether plain or clincher. In the former case, I may also provide an auxiliary ring internally channeled, to hold an extra inflatable tube. With the casing mounted on this rim, and the tread cover around the outside of the casing, the new tread extending around the casing within the mold, the parts are secured in position by wrapping with a layer of binding or tape and this wrapping may be drawn very taut by inflating the supplemental air tube referred to. After the parts are secured in position current is passed through the heating wires, and the required temperature around and over the new tread is maintained for the requisite time to effect perfect and uniform curing. The auxiliary tube is then deflated if used, the wrapping is removed and the entire circle of the tread will remain completely cured in a single operation.

While the cover is on, and curing is proceeding, a uniform temperature is maintained by means of a thermostat which will be described but not claimed herein, as it forms the subject of a separate application for patent Serial No. 530,658, filed April 16, 1931. I consider the combination of the thermostat with the electrical heating wires extending completely around the periphery of the tread, to be important and shall claim the same accordingly. It should be understood that uniform curing can only be produced in this manner by a full circle device such as I describe herein.

My invention is illustrated in the accompanying drawing, in which

Fig. 1 is a perspective view partly in section of a portion of the peripheral cover.

Fig. 2 is a radial section through a casing with a new tread, retreading apparatus and clincher rim, all assembled and ready for curing.

Fig. 3 is a perspective view similar to Fig. 1 showing a plain holding rim, supplemental rim and supplemental air tube.

Fig. 4 is a side view on a reduced scale, of the assembly shown in Fig. 2.

Fig. 5 is a diagram showing one method of arranging the convolutions of the heating element.

Referring to the drawing, 1 is the peripheral cover, formed in one piece as indicated in Fig. 4, and reenforced around its outside or tread covering portion by a continuous layer 2 of fabric or cording to prevent stretching of the cover 1. This cover is formed of rubber molded with an inner channel 3 of the same cross sectional area and shape as the new gum tread 4. Embedded in the rubber cover 1 and extending all around the same, are the electrical heating wires 5, the arrangement of which is best indicated in Fig. 5. These heating wires are laid up in parallel convolutions extending across the tread or peripheral portion of the cover 1, and over the channel 3 which receives the gum tread 4. The current flow through these resistance wires is thermostatically controlled, so as to maintain a uniform temperature completely across and around the peripheral cover. The thermostat which I employ is preferably that described and claimed in my copending application Serial No. 530,658, filed April 16, 1931, but may be of any other suitable form which will meet my present requirements. In the diagram of Fig. 4, I have indicated the bottom of the thermostat 16 as being in close proximity to the heating wires. In practice, the thermostat which is enclosed within a small box is laid against the tread cover 1 above the heating wires, or may be placed within the casing directly beneath the tread. In either case, there is little or no air conduction of heat relied upon. The thermostat box is of metal and the thermostat elements are of metal resting against the metal of the box which in turn rests against the fabric or rubber. A uniform effect completely around the tread is thus maintained within a very few degrees Fahrenheit.

6 indicates the tire casing, which in Fig. 3 is shown with plain or straight sided flanges and in Fig. 2 is shown with clincher flanges. 7 is the inner tube which is inflated to create the required pressure. 10 in Fig. 2 indicates smooth metal rings to insure ready slip of the binding over the bead of the casing 6 as the tube 7 is inflated. 8 in Fig. 2 is a metal ring to support the walls of the casing and to prevent the tube 7 from pinching under the bead as it would if the ring did not extend down some distance to the point 9 on each side. 11 indicates the layers of binding which holds the retreader in place.

Referring to Fig. 3, instead of the clincher beads or flanges on the casing 6, and the slip rings 10, in this modification I use a metal ring 12 upon which the tire is mounted, and which may be the same rim on which the tire is mounted when in actual use. 13 is another metal rim with its side flanges inverted, placed inside the rim 12. 14 is a second specially built inner-tube, which is laid in the ring 13 and inflated to create the required pressure. 15 is a strip or ring of fabric laid over the outside face of the tube 14 for protection. The casing 6 and the inner tube 7, with the other parts broken away in Fig. 3, are supposed to be the same as those in the upper part of Fig. 2, the only substantial difference between these two forms being in the casing beads or flanges, and the rim parts for receiving and holding them.

If it should be desired, the rubber matrix 3 may be provided with any desirable tread design to be pressed into and thereby transferred to the new tread 4.

The rubber matrix 3 may be replaced by a metal matrix consisting of short segments hinged to one another and extending all around the inside of the cover 1. This metal matrix would rest against the inside face of the rubber cover 1, or against a rubber or fabric layer containing the heating element.

It will be understood that a number of changes and modifications can be made in non-essential details of this design, both in regard to the method and the apparatus, without departing from the scope and purview of my invention. Thus, the tread cover or matrix 1, which is of rubber, may be made of any other suitable material, and may be formed in one continuous integral ring to be stretched over the outside of the casing 6 or it may be made with an opening at one point, in which case, the ends should overlap. I consider the continuous ring form preferable, as shown in Fig. 4. I wish it clearly understood that I contemplate all such non-essential changes and modifications as fall fairly within the scope of the appended claims.

What I claim is:

1. The method of retreading a pneumatic tire casing which comprises the following steps: applying a new tread of uncured gum completely around the periphery of the casing; covering the same continuously around the periphery, applying pneumatic pressure continuously around the inside of the casing, opposing the same with pneumatic pressure separately applied to said covering and applying heat across the tread uniformly throughout the entire periphery of the same.

2. A full circle retreader for pneumatic tire casings comprising the following instrumentalities: an external covering containing a tread mold and adapted to extend completely around and entirely cover the periphery of the casing, heating means within the substance of said cover extending across and around said mold, and means for expanding the tire casing within the cover so as to force the gum tread into said mold, together with separate means for tightening said cover in opposition to the expansion of the tire casing therein.

3. A full circle retreader for pneumatic tire casings comprising the following instrumentalities: an external covering containing a tread mold and adapted to extend completely around and entirely cover the periphery of the casing, heating means within the substance of said cover extending completely across and around the entire surface of said mold, and means for expanding the tire casing within the cover so as to force the gum tread into said mold, said heating means consisting of electrical resistance wires laid in parallel convolutions crossing the said mold from side to side around the entire periphery thereof in such manner as to heat the entire body of the tread and every part thereof with absolute uniformity.

4. A full circle retreader for pneumatic tire casings comprising the following instrumentalities: an external covering containing a tread mold and adapted to extend completely around and entirely cover the periphery of the casing, heating means within the substance of said cover extending across and around said mold, and means for expanding the tire casing within the cover so as to force the gum tread into said mold, together with a layer of inexpansible material such as fabric or cording extending completely around the periphery of the cover and secured thereto outside of the mold.

5. A full circle retreader for pneumatic tire casings comprising the following instrumentalities: an external covering containing a tread mold and adapted to extend completely around and entirely cover the periphery of the casing, heating means within the substance of said cover extending across and around said mold, and means for expanding the tire casing within the cover so as to force the gum tread into said mold, said cover being composed of cured rubber.

6. Means for full circle retreading pneumatic tires comprising the following instrumentalities: a full circle tread cover containing an internal mold to receive the new gum mold to be cured on the casing; heating means within and around the tread of said tread cover in proximity to the mold, inexpansible means for securing said tread cover upon and around the casing, an inner tube within the casing and means to expand the same, and a pair of metal rings extending between the tube and the beads or flanges of the casing all around, to prevent the casing from overlapping said beads.

7. Means for full circle retreading pneumatic tires comprising the following instrumentalities: a full circle tread cover containing an internal mold to receive the new gum mold to be cured on the casing; heating means within and around the body of said tread cover in proximity to the mold, inexpansible means extending completely around the said cover and casing for securing said tread cover upon and around the casing, an inner tube within the casing and means to expand the same, and metal rings applied to the beads of the casing to engage said inexpansible securing means.

8. Means for full circle retreading pneumatic tires comprising the following instrumentalities: a full circle tread cover containing an internal mold to receive the new gum mold to be cured on the casing; heating means within and around the body of said tread cover in proximity to the mold, inexpansible means for securing said tread cover upon and around the casing, an inner tube within the casing and means to expand the same, a rim receiving the beads or flanges of the casing, a supplemental rim or ring within the same, and a supplemental expansible tube extending around said supplemental ring between it and said inexpansible securing means, whereby after expansion of the inner tube, further expansion of the supplemental tube will produce any desired tension on the securing means and the tread.

9. The method of retreading a pneumatic tire described in claim 1 with the additional step of causing the opposed pneumatic pressures to forcibly mold the tread in any desired shape or surface configuration.

In testimony whereof I hereunto affix my signature.

ARTHUR WILSON GAY.